United States Patent
Huang et al.

(10) Patent No.: US 6,500,246 B2
(45) Date of Patent: Dec. 31, 2002

(54) INK-JET INK COMPOSITION

(75) Inventors: Hong-Chang Huang, Taipei (TW); Jen-Fang Lin, Taipei (TW)

(73) Assignee: Everlight USA, Inc., Pineville, NC (US)

( * ) Notice: Subject to any disclaimer, the term of this patent is extended or adjusted under 35 U.S.C. 154(b) by 97 days.

(21) Appl. No.: 09/754,201

(22) Filed: Jan. 5, 2001

(65) Prior Publication Data

US 2002/0130319 A1 Sep. 19, 2002

(51) Int. Cl.[7] .................................................. C09D 11/02
(52) U.S. Cl. .............................. 106/31.27; 106/31.58; 106/31.59
(58) Field of Search ........................... 106/31.27, 31.58, 106/31.59

(56) References Cited

U.S. PATENT DOCUMENTS

| | | | | | |
|---|---|---|---|---|---|
| 5,788,750 | A | * | 8/1998 | Gundlach et al. | 106/31.27 |
| 6,004,389 | A | * | 12/1999 | Yatake | 106/31.28 |
| 6,048,390 | A | * | 4/2000 | Yano et al. | 106/31.43 |
| 6,261,350 | B1 | * | 7/2001 | Kabalnov | 106/31.33 |
| 6,383,274 | B1 | * | 5/2002 | Lin | 106/31.27 |

* cited by examiner

*Primary Examiner*—Helene Klemanski
(74) *Attorney, Agent, or Firm*—Bacon & Thomas

(57) ABSTRACT

The present invention provides an ink-jet ink composition which includes (a) at least one water-soluble dye; (b) at least one low vapor-pressure solvent; (c) a nonionic non-amphoteric surfactant; (d) a fluoric surfactant; and (e) balanced water. The ink-jet ink composition of the present invention is suitable for thermal ink-jet printers.

18 Claims, No Drawings

INK-JET INK COMPOSITION

BACKGROUND OF THE INVENTION

1. Field of the Invention

The present invention relates to an ink-jet ink composition and, more particularly, to an ink-jet ink composition suitable for thermal ink-jet printing.

2. Description of Related Art

Currently, ink-jet printing achieved by ejecting ink to a printing medium through a printhead in accordance with a piezoelectric type or thermal ink jet type is well known. The piezoelectric type is applied by supplying a voltage to the piezoelectric material which can expand and shrink so as to generate a jetting spray. The thermal ink jet type is utilized by heating and vaporizing ink to form bubbles and jetting onto a printing medium.

For the thermal ink jet type, there exist some shortcomings such as whisks and satellites, which always retard the resolution and other characteristics of an image. Satellites are the undesired small dots that form around the main droplet at the instance of jetting. Furthermore, when too many satellites are formed, blots will be observed. This has a serious impact on printing quality, since the image will become unclear and blurry.

In order to overcome the above disadvantages, U.S. Pat. No. 4,794,411 discloses a modified printhead by shifting the resistor below the orifice. U.S. Pat. No. 5,992,968 also provides a method of reducing the returning speed of the printhead after printing. Such design may shorten the distance between the satellites and the main droplet, but can't eliminate these satellites.

Therefore, it is desirable to improve the printing quality in different ways, for example, providing an alternative ink-jet ink composition, to mitigate and/or obviate the aforementioned problems.

SUMMARY OF THE INVENTION

The object of the present invention is to provide an ink-jet ink composition which can decrease satellites, avoid blots, and improve image quality when applying on a printing medium.

To achieve the object, the ink-jet ink composition of the present invention includes (a) at least one water-soluble dye; (b) at least one low vapor-pressure solvent; (c) a nonionic non-amphoteric surfactant; (d) a fluoric surfactant; and (e) the balance water. The ink-jet ink composition of the present invention is suitable for thermal ink-jet printing.

Other objects, advantages, and novel features of the invention will become more apparent from the following detailed description.

DETAILED DESCRIPTION OF THE PREFERRED EMBODIMENT

The ink-jet ink composition of the present invention includes (a) at least one water-soluble dye; (b) at least one low vapor-pressure solvent; (c) a nonionic non-amphoteric surfactant; (d) a fluoric surfactant; and (e) the balance water. Additionally, the ink-jet ink composition of the present invention can further include (f) at least one additive.

The water-soluble dye used in the ink-jet ink composition of the present invention can be selected from the group consisting of C.I. Acid Blue 9, C.I. Acid Red 18, C.I. Acid Red 27, C.I. Acid Red 2, C.I. Acid Yellow 23, C.I. Direct Blue 199, C.I. Direct Violet 99, C.I. Direct Yellow 86, C.I. Reactive Red 180, C.I. Reactive Red 159, C.I. Reactive Black 31 and Black-sp. The above water-soluble dyes can be used solely or by mixing with each other or with alkaline or ammonium compounds thereof. The concentration of the water-soluble dye is preferred between 0.1 and 10 wt %.

The low vapor-pressure solvent used in the ink-jet ink composition of the present invention can be selected from the group consisting of glycols such as ethylene glycol, diethylene glycol, triethylene glycol, tetraethylene glycol, propylene glycol, polyethylene glycol, polypropylene glycol, and derivatives thereof; diols such as butanediol, pentanediol, hexanediol, and homologous diols; glycol esters such as propylene glycol laurate; mono and diglycol ethers such as cellosolves, including ethylene glycol monobutyl ether, diethylene glycol ethers such as the carbitols, diethylene glycol mono ethyl, butyl, hexyl ethers, propylene glycol ether, dipropylene glycol ether, and triethylene glycol ether; long chain alcohols such as butyl alcohol, pentyl alcohol, and homologous alcohols; and other solvents such as sulfolane, esters, ketones, lactones such as .gamma.-butyro-lactone, lactams such as N-pyrrolidone and N-(2-hydroxyethyl)pyrrolidone, and glycerols and their derivatives.

The concentration of the low vapor-pressure solvent is preferred between 0 to 20 wt %.

An example of the nonionic non-amphoteric surfactant used in the present invention is acetylene glycol of formula (I), such as SURFYNOL 465 or SURFYNOL 104 supplied by Air Products & Chemicals, Inc.

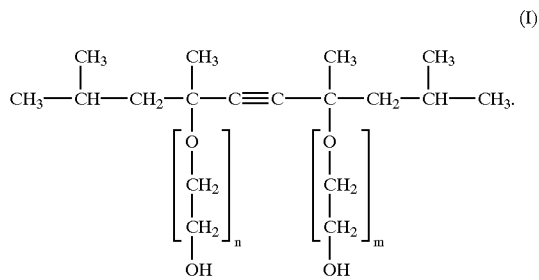

(I)

wherein the sum of n and m is an integer between 0 and 50, preferably between 0 and 20.

An example of the fluoric surfactant used in the present invention is fluoroaliphatic polymeric esters, including FC-430, FC-431, FC-740 supplied by 3M Co.

The weight ratio of the nonionic non-amphoteric surfactant to the fluoric surfactant is preferred between 1:1 and 1000:1, preferably between 30:1 and 800:1. The concentration of the nonionic non-amphoteric surfactant can range from 0.1 to 3 wt %, and that of the fluoric surfactant can range from 0.001 to 0.005 wt %.

In the present invention, the ink-jet ink composition can optionally include other additives such as microbial reagents. For example, NUOSEPT (supplied by Nudex, Inc., a division of Huls Americal), UCARCIDE (supplied by Union Carbide), VANCIDE (supplied by RT Vanderbilt Co.) and PROXEL (supplied by ICI Americas). The concentration of the microbial reagents can range from 0.1 to 0.5 wt %.

Additionally, water is used to balance the ink-jet ink composition in the present invention.

The following examples and comparative examples are used to further describe the present invention. However, the scope of the present invention will not be limited by such examples.

EXAMPLE 1

C.L. Acid Yellow 23 (1.68 parts), 2-pyrrolidone (6 parts), diethylene glycol (7 parts), Proxel×12 (0.2 parts), nonionic non-amphoteric surfactant SURFYNOL 465 (0.5 parts), 0.2% FC-430 fluoric surfactant (1 part) and water (83.62 parts) are mixed at room temperature to prepare an ink-jet ink composition of the present invention.

EXAMPLE 2

Repeat the steps of Example 1 with different ratios as listed in Table 1, and the another ink-jet ink composition of the present invention is obtained.

COMPARATIVE EXAMPLE 1

Repeat the steps of Example 1 with ratios as listed in Table 1 to prepare a comparative ink-jet ink composition, in which the nonionic non-amphoteric surfactant SURFYNOL 465 is not added.

COMPARATIVE EXAMPLE 2

Repeat the steps of Example 1 with different ratios as listed in Table 1, and then another comparative ink-jet ink composition is obtained, in which the fluoric surfactant FC-430 is not added.

TABLE 1

| ink-jet ink composition | Example 1 | Example 2 | Comparative Example 1 | Comparative Example 2 |
|---|---|---|---|---|
| C.I. Acid Yellow 23 | 1.68 | 1.68 | 1.68 | 1.68 |
| 2-pyrrolidone | 6 | 6 | 6 | 6 |
| diethylene glycol | 7 | 7 | 7 | 7 |
| Proxel xl2 | 0.2 | 0.2 | 0.2 | 0.2 |
| SURFYNOL 465 | 0.5 | 1.5 | 0 | 0.2 |
| 0.2% FC-430 | 1 | 1 | 0.5 | 0 |
| balanced water | 83.62 | 82.62 | 84.62 | 84.92 |

EXAMPLES 3 to 7 AND COMPARATIVE EXAMPLES 3 to 8

Repeat the steps of Example 1 with different ratios as listed in Tables 2 to 4, and further ink-jet ink compositions are obtained.

TABLE 2

| ink-jet ink composition | Example 3 | Example 4 | Comparative Example 3 | Comparative Example 4 |
|---|---|---|---|---|
| C.I. Acid Red 52 | 2 | 2 | 2 | 2 |
| C.I. Reactive Red 180 | 2 | 2 | 2 | 2 |
| C.I. Reactive Red 159 | 0.8 | 0.8 | 0.8 | 0.8 |
| 2-pyrrolidone | 6 | 6 | 6 | 6 |
| diethylene glycol | 7 | 7 | 7 | 7 |
| Proxel xl2 | 0.2 | 0.2 | 0.2 | 0.2 |
| SURFYNOL 465 | 0.4 | 0.5 | 0 | 0.4 |
| 0.2% FC-430 | 2 | 1 | 1 | 0 |
| balanced water | 79.6 | 80.5 | 81.0 | 81.6 |

TABLE 3

| ink-jet ink composition | Example 5 | Comparative Example 5 | Comparative Example 6 |
|---|---|---|---|
| C.I. Direct Blue 199 | 2 | 2 | 2 |
| 2-pyrrolidone | 6 | 6 | 6 |
| diethylene glycol | 7 | 7 | 7 |
| Proxel xl2 | 0.2 | 0.2 | 0.2 |
| SURFYNOL 465 | 0.1 | 0 | 0.2 |
| 0.2% FC-430 | 1.5 | 0.5 | 0 |
| balanced water | 83.2 | 84.3 | 84.6 |

TABLE 4

| ink-jet ink composition | Example 6 | Example 7 | Comparative Example 7 | Comparative Example 8 |
|---|---|---|---|---|
| C.I. Reactive Black 31 | 0.5 | 0.5 | 0.5 | 0.5 |
| C.I. Direct Violet 99 | 0.2 | 0.2 | 0.2 | 0.2 |
| Black-sp | 4 | 4 | 4 | 4 |
| 2-pyrrolidone | 6 | 6 | 6 | 6 |
| diethylene glycol | 7 | 7 | 7 | 7 |
| Proxel xl2 | 0.2 | 0.2 | 0.5 | 0.2 |
| SURFYNOL 465 | 0.5 | 0.5 | 0 | 0.3 |
| 0.2% FC-430 | 1.5 | 1 | 0.5 | 0 |
| balanced water | 80.1 | 80.6 | 81.3 | 81.8 |

Test Method

By using a thermal ink-jet printer, the above inks are utilized to print squares on paper, and then the satellites, blots and image quality thereon are observed.

Satellite:

By counting the satellites in a blank certain area adjacent to the square through a magnifier, and the printing effect is evaluated with the following criteria:

| satellite number: | 0 to 10 | Good |
|---|---|---|
| | 10 to 25 | Average |
| | more than 25 | Poor |

Blot:

By counting the blots in a certain area of the square, the printing effect is evaluated with the following criteria:

| blot number: | 0 to 1 | Good |
|---|---|---|
| | 2 to 3 | Average |
| | more than 4 | Poor |

Image Quality:

By directly observing the squares, and classifying them into Good, Average, or Poor according to objective opinions of the observers.

The test results are listed in Table 5.

TABLE 5

|  | Satellite | Blot | Image Quality |
|---|---|---|---|
| Example 1 | Good | Good | Good |
| Example 2 | Good | Good | Average |
| Comparative Example 1 | Good | Good | Poor |
| Comparative Example 2 | Good | Good | Average |
| Example 3 | Good | Good | Good |
| Example 4 | Good | Good | Average |
| Comparative Example 3 | Good | Good | Poor |
| Comparative Example 4 | Average | Average | Average |
| Example 5 | Good | Good | Good |
| Comparative Example 5 | Good | Good | Poor |
| Comparative Example 6 | Average | Good | Poor |
| Example 6 | Good | Good | Good |
| Example 7 | Good | Good | Average |
| Comparative Example 7 | Good | Good | Poor |
| Comparative Example 8 | Good | Good | Average |

As shown in Table 5, for most Examples of the present invention, the results are "Good" and a few of them are "Average". In other words, the effects of the Examples are positive in all items. However, for the Comparative Examples, most of them indicate "Poor" Image Quality, and the other results are "Average".

Accordingly, the ink-jet ink compositions of the present invention do improve the effect of printing, when the two nonionic surfactants are added.

Although the present invention has been explained in relation to its preferred embodiment, it is to be understood that many other possible modifications and variations can be made without departing from the spirit and scope of the invention as hereinafter claimed.

What is claimed is:
1. An ink-jet ink composition, comprising:
   (a) at least one water-soluble dye;
   (b) at least one low vapor pressure solvent;
   (c) a nonionic non-amphoteric surfactant which is an acetylene glycol of formula (I)

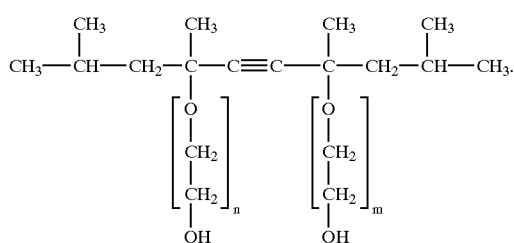

(I)

wherein the sum of n and m is an integer ranging from 0 to 50;
   (d) a fluoric surfactant which is a fluoroaliphatic polymeric ester; and
   (e) the balance water.

2. The ink-jet ink composition of claim 1, wherein said sum of n and m is an integer ranging from 0 to 20.

3. The ink-jet ink composition of claim 1, wherein said nonionic non-amphoteric surfactant and said fluoric surfactant are mixed in a ratio between 1:1 and 1000:1.

4. The ink-jet ink composition of claim 3, wherein said nonionic non-amphoteric surfactant and said fluoric surfactant are mixed in a ratio between 30:1 to 800:1.

5. The ink-jet ink composition of claim 1, wherein said nonionic non-amphoteric surfactant has a concentration ranging from 0.1 to 3 wt. %, and said fluoric surfactant has a concentration ranging from 0.001 to 0.005 wt %.

6. The ink-jet ink composition of claim 1, wherein said water-soluble dye is selected form the group consisting of C.I. Acid Blue 9, C.I. Acid Red 18, C.I. Acid Red 27, C.I. Acid Red 2, C.I. Acid Yellow 23, C.I. Direct Blue 199, C.I. Direct Yellow 86, C.I. Reactive Red 180, and C.I. Reactive Black 31, or mixtures thereof.

7. The ink-jet ink composition of claim 6, wherein said water-soluble dye has a concentration between 0.1 and 10 wt %.

8. The ink-jet ink composition of claim 1, wherein said low vapor-pressure solvent is selected from the group consisting of glycols, diols, glycol esters, mono and diglycol esters, long-chain alcohols, esters, ketone, lactones and lactams, and the mixtures thereof.

9. The ink-jet ink composition of claim 8, wherein said lactam is 2-pyrrolidone.

10. The ink-jet ink composition of claim 8, wherein said glycol is diethylene glycol.

11. The ink-jet ink composition of claim 8, wherein said low vapor-pressure solvent has a concentration ranging from 0 to 20 wt %.

12. The ink-jet ink composition of claim 1 further comprising microbial reagents.

13. The ink-jet ink composition of claim 12, wherein said microbial reagent has a concentration ranging from 0.1 to 0.5 wt %.

14. An ink-jet ink composition, consisting essentially of:
   (a) at least one water-soluble dye;
   (b) at least one low vapor pressure solvent;
   (c) a nonionic non-amphoteric surfactant which is an acetylene glycol of formula (I)

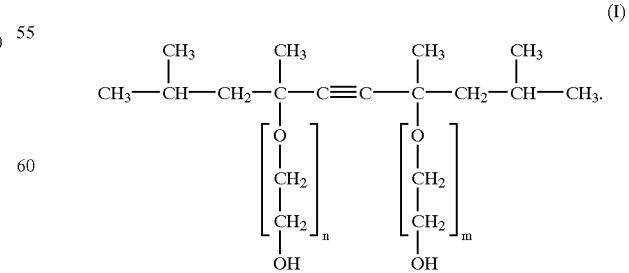

(I)

wherein the sum of n and m is an integer ranging from 0 to 50;

(d) a fluoric surfactant which is a fluoroaliphatic polymeric ester; and (e) the balance water.

15. The ink-jet ink composition of claim 14, wherein the sum of n and m is an integer ranging from 0 to 20, the nonionic non-amphoteric surfactant and the fluoric are present in a ratio between 30:1 to 800:1.

16. The ink-jet ink composition of claim 15, wherein said nonionic non-amphoteric surfactant has a concentration ranging from 0.1 to 3 wt. %, and said fluoric surfactant has a concentration ranging from 0.001 to 0.005 wt. %.

17. The ink-jet ink composition of claim 16, wherein said water-soluble dye is selected form the group consisting of C.I. Acid Blue 9, C.I. Acid Red 18, C.I. Acid Red 27, C.I. Acid Red 2, C.I. Acid Yellow 23, C.I. Direct Blue 199, C.I. Direct Yellow 86, C.I. Reactive Red 180, and C.I. Reactive Black 31, or mixtures thereof.

18. The ink-jet ink composition of claim 17, wherein the water-soluble dye has a concentration between 0.1 and 10 wt. % and wherein the low-vapor pressure solvent as selected from the group consisting of 2-pyrrolidone and diethylglycol.

* * * * *